US008683530B2

(12) United States Patent
Matz

(10) Patent No.: US 8,683,530 B2
(45) Date of Patent: *Mar. 25, 2014

(54) APPARATUS FOR RECEIVING AND DISPLAYING CELLULAR TELEVISION CONTENT AND METHOD FOR BILLING FOR SAME

(71) Applicant: AT&T Intellectual Property I, LP, Atlanta, GA (US)

(72) Inventor: William Matz, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/660,329

(22) Filed: Oct. 25, 2012

(65) Prior Publication Data

US 2013/0055317 A1 Feb. 28, 2013

Related U.S. Application Data

(63) Continuation of application No. 11/479,053, filed on Jun. 30, 2006, now Pat. No. 8,307,398.

(51) Int. Cl.
*H04N 7/16* (2011.01)
(52) U.S. Cl.
USPC ............... 725/62; 725/68; 725/81; 725/100; 725/130; 725/151
(58) Field of Classification Search
USPC ........ 725/62, 68, 81, 100, 110, 131, 139, 151
See application file for complete search history.

(56) References Cited

U.S. PATENT DOCUMENTS

| 5,157,496 | A | 10/1992 | Kurosawa |
| 6,263,503 | B1 * | 7/2001 | Margulis ........................ 725/81 |
| 6,487,422 | B1 | 11/2002 | Lee |
| 6,529,233 | B1 | 3/2003 | Allen |
| 6,970,127 | B2 | 11/2005 | Rakib |
| 7,006,831 | B2 | 2/2006 | Matz et al. |
| 7,027,768 | B2 * | 4/2006 | Hill ............................. 455/3.06 |
| 7,194,259 | B2 | 3/2007 | DeLine |
| 7,266,834 | B1 | 9/2007 | Lund et al. |
| 7,344,084 | B2 | 3/2008 | DaCosta |

(Continued)

OTHER PUBLICATIONS

U.S. Office Action dated Sep. 30, 2008 in U.S. Appl. No. 11/479,053.

(Continued)

*Primary Examiner* — Mulugeta Mengesha
(74) *Attorney, Agent, or Firm* — Hartman & Citrin LLC

(57) ABSTRACT

An apparatus and method are provided for receiving and displaying cellular television content. In one embodiment, the apparatus includes a wireless communication device for establishing a connection to a wireless telecommunications network and for receiving video content over the connection. The apparatus includes a processor for receiving the cellular television content and the television signal. The processor generates a signal for display on a video display screen from the television signal and the video content. A video display screen is also provided in the apparatus for displaying the signal. The apparatus may also include a remote control interface and a remote control device that includes a keypad for establishing a wireless telephone call through the apparatus over the wireless telecommunications network. The apparatus may alternatively include an interface for receiving and communicating with a wireless telephone capable of establishing a connection to a wireless telecommunications network and receiving cellular television.

16 Claims, 6 Drawing Sheets

(56) References Cited

U.S. PATENT DOCUMENTS

| | | |
|---|---|---|
| 7,363,002 B2 | 4/2008 | Hill |
| 7,634,296 B2 | 12/2009 | Haeusel |
| 7,634,794 B1 | 12/2009 | Paik et al. |
| 2001/0021998 A1* | 9/2001 | Margulis ........................ 725/81 |
| 2003/0040334 A1* | 2/2003 | Lee ............................. 455/557 |
| 2003/0092377 A1* | 5/2003 | Hill ............................ 455/3.06 |
| 2004/0148632 A1 | 7/2004 | Park et al. |
| 2004/0266489 A1* | 12/2004 | Chipchase et al. ........... 455/567 |
| 2005/0064860 A1* | 3/2005 | DeLine ....................... 455/420 |
| 2005/0282582 A1 | 12/2005 | Slotznick |
| 2005/0288058 A1* | 12/2005 | Chandhok et al. ........ 455/556.1 |
| 2006/0041916 A1 | 2/2006 | McQuaide |
| 2006/0053436 A1* | 3/2006 | Allwein et al. .................. 725/1 |
| 2006/0077310 A1* | 4/2006 | Wang et al. .................. 348/838 |
| 2006/0195873 A1* | 8/2006 | Gopalan et al. ............. 725/100 |
| 2006/0203758 A1* | 9/2006 | Tee et al. .................... 370/315 |
| 2007/0060054 A1* | 3/2007 | Romesburg ................. 455/41.2 |
| 2007/0086724 A1 | 4/2007 | Grady et al. |
| 2007/0124778 A1 | 5/2007 | Bennett et al. |
| 2007/0143806 A1 | 6/2007 | Pan |
| 2007/0157271 A1 | 7/2007 | Hiraoka |
| 2007/0174887 A1 | 7/2007 | Hu et al. |
| 2007/0189711 A1 | 8/2007 | Ash et al. |
| 2007/0214484 A1 | 9/2007 | Taylor et al. |
| 2008/0036851 A1 | 2/2008 | Patel |

OTHER PUBLICATIONS

U.S. Office Action dated Apr. 27, 2009 in U.S. Appl. No. 11/479,053.
U.S. Office Action dated Aug. 18, 2009 in U.S. Appl. No. 11/479,053.
U.S. Office Action dated Feb. 2, 2010 in U.S. Appl. No. 11/479,053.
U.S. Office Action dated Jul. 16, 2010 in U.S. Appl. No. 11/479,053.
U.S. Office Action dated Feb. 1, 2011 in U.S. Appl. No. 11/479,053.
U.S. Office Action dated Jun. 28, 2011 in U.S. Appl. No. 11/479,053.
U.S. Office Action dated Dec. 2, 2011 in U.S. Appl. No. 11/479,053.
U.S. Notice of Allowance dated Jun. 26, 2012 in U.S. Appl. No. 11/479,053.
Article in The Wall Street Journal entitled, "The Small Picture" dated Apr. 3, 2006, 3 sheets.

* cited by examiner

APPARATUS FOR RECEIVING AND DISPLAYING CELLULAR TELEVISION CONTENT AND METHOD FOR BILLING FOR SAME

CROSS REFERENCE TO RELATED APPLICATIONS

This application is a continuation of U.S. application Ser. No. 11/479,053, now U.S. Pat. No. 8,307,398, entitled "Apparatus for Receiving and Displaying Cellular Television Content and Method for Billing for Same" filed Jun. 30, 2006, now U.S. Pat. No. 8,307,398, which is herein expressly incorporated by reference in its entirety.

TECHNICAL FIELD

This application relates generally to the field of communication. More specifically, the disclosure provided herein relates to the field of wirelessly receiving and displaying audio/video content.

BACKGROUND

As mobile telephones and other types of wireless communication devices have become more and more ubiquitous, the number of uses for these devices has grown dramatically. Today, mobile telephones can be used not only to place and receive wireless telephone calls, but also to perform many other tasks. For instance, mobile telephones can now be utilized to send and receive electronic mail messages, to take still photographs and video, to engage in instant messaging or text messaging conversations, and to perform a variety of other tasks.

One capability of mobile telephones that is becoming increasingly popular is the ability to wirelessly receive and display video content. Using a capable mobile telephone, a user can receive and view a multitude of channels of video content. This content is generally referred to as "cellular television." The cellular television content is provided to mobile telephones over a wireless telecommunications network and is therefore available to mobile telephone users wherever they may happen to be.

Because cellular television is generally available whenever a mobile telephone subscriber is within their service area, watching cellular television has become a popular activity for many mobile telephone subscribers. In particular, watching cellular television on a mobile telephone has become very popular for commuters that utilize train or bus transportation. Cellular television allows these commuters to pass the time while they commute to and from work, school, or other activities. Cellular television has also become extremely popular for subscribers that need to pass the time while waiting, for instance, at a doctor's office or while in line at the supermarket or bank.

Although cellular television has become popular for on-the-go mobile telephone subscribers, it has not been generally accepted and utilized for in-home consumption. This is generally the result of the small screen size of mobile telephones. It can be tiresome to watch cellular television for long periods of time on such a small screen. Another factor that limits the ability of a subscriber to watch cellular television in the home is the relatively short battery life of many mobile telephones. While a subscriber can plug their mobile telephone into a wall adapter for power and charging, this too is generally inconvenient for a subscriber that wishes to watch a cellular television program.

It is with respect to these considerations and others that aspects of an apparatus for receiving and displaying cellular television content are described below.

SUMMARY

According to one aspect of the disclosure presented herein, an integrated television apparatus is provided for receiving and displaying digital video content provided over a wireless telecommunications network along with traditional television programming. According to one implementation, the apparatus provides a full-sized display screen and a remote control suitable for watching cellular television in a similar manner as traditional television broadcasts. By allowing users to watch cellular television in a manner similar to traditional television programming, mobile telephone subscribers are more likely to watch cellular television in their home or workplace environments.

According to one aspect of the disclosure provided herein, an apparatus is disclosed that includes a wireless communication device, such as a wireless radio, for establishing a connection to a wireless telecommunications network and for receiving digital video content over the connection. Digital video content provided over a wireless network may be referred to herein as "cellular television." The apparatus also includes a receiver for receiving a television signal. The television signal may comprise an analog over-the-air ("OTA") signal, a digital OTA signal, or a cable television signal.

According to other aspects, the apparatus also includes a processor for receiving the cellular television content from the wireless communication device and for receiving the television signal from the receiver. The processor is operative to generate a signal suitable for display on a video display screen from the television signal and the digital video content. A display controller receives the signal from the processor and formats the signal for display on a video display screen. A video display screen is also provided in the apparatus for displaying the signal. According to aspects, the display screen is significantly larger than display screens found in mobile telephones and may include, by way of example, a video display provided by the user's family television screen.

According to other aspects, the apparatus also includes an input for receiving an external video signal, such as a component, composite, high-definition multimedia interface ("HDMI"), or video graphics array ("VGA") signal. In this implementation, the processor is also operative to receive the external video signal and to cause the external video signal to be shown on the video display. A mechanism may also be provided to enable a user to switch between viewing the digital video content, the television signal, and the external input.

According to other aspects, the apparatus may also include a remote control interface and a remote control device that includes a keypad. The remote control device is operative to communicate wirelessly with the remote control interface. Through the use of the keypad on the remote control device, a user can establish a wireless telephone call through the apparatus over the wireless telecommunications network. The wireless telephone call may be established in response to an incoming call request or as an outgoing wireless telephone call. Call status, caller identification, and other information may be shown by the apparatus on the video display along with the cellular television content.

According to other aspects, the remote control device may include a microphone and a speaker. The microphone may be utilized to receive audio and to transmit the audio to the apparatus wirelessly for use in the wireless telephone call.

The remote control device may also wirelessly receive the audio portion of the wireless telephone call and play the audio on the speaker. The apparatus itself may also be equipped with a microphone and speaker for performing similar functions and, by way of example, may include the user's cellular telephone.

According to another implementation, the apparatus includes an interface for receiving and communicating with a wireless communication device capable of establishing a connection to a wireless network and receiving digital video content. The interface may include a physical interface that allows the processor to receive the digital video content from the wireless communication device for display on the video display. The interface also provides power to the mobile telephone and can include power for charging a battery contained therein.

According to other aspects, a method is provided for billing a user of the apparatus provided herein. In particular, a user may subscribe to billing plans for one or more of the apparatuses provided herein. The subscription rate of the billing plan may vary based upon the number of apparatuses for which a subscription is made. A service bundle may also be provided to the subscriber that lowers the subscription rate if a subscription is made for combinations of mobile wireless service, including cellular television, and fixed wireless service utilizing the apparatus provided herein. For example, a user may receive a discount for subscribing to both cellular television and television using the cellular signal to exhibit content on other devices. The rate and availability of the mobile wireless services, including cellular television services, may also vary based on the time of day that the services are consumed or the amount of wireless data bandwidth required to display the content.

Other systems, methods, and/or computer program products according to embodiments will be or become apparent to one with skill in the art upon review of the following drawings and Detailed Description. It is intended that all such additional systems, methods, and/or computer program products be included within this description, be within the scope of the present invention, and be protected by the accompanying claims.

It should be appreciated that this Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
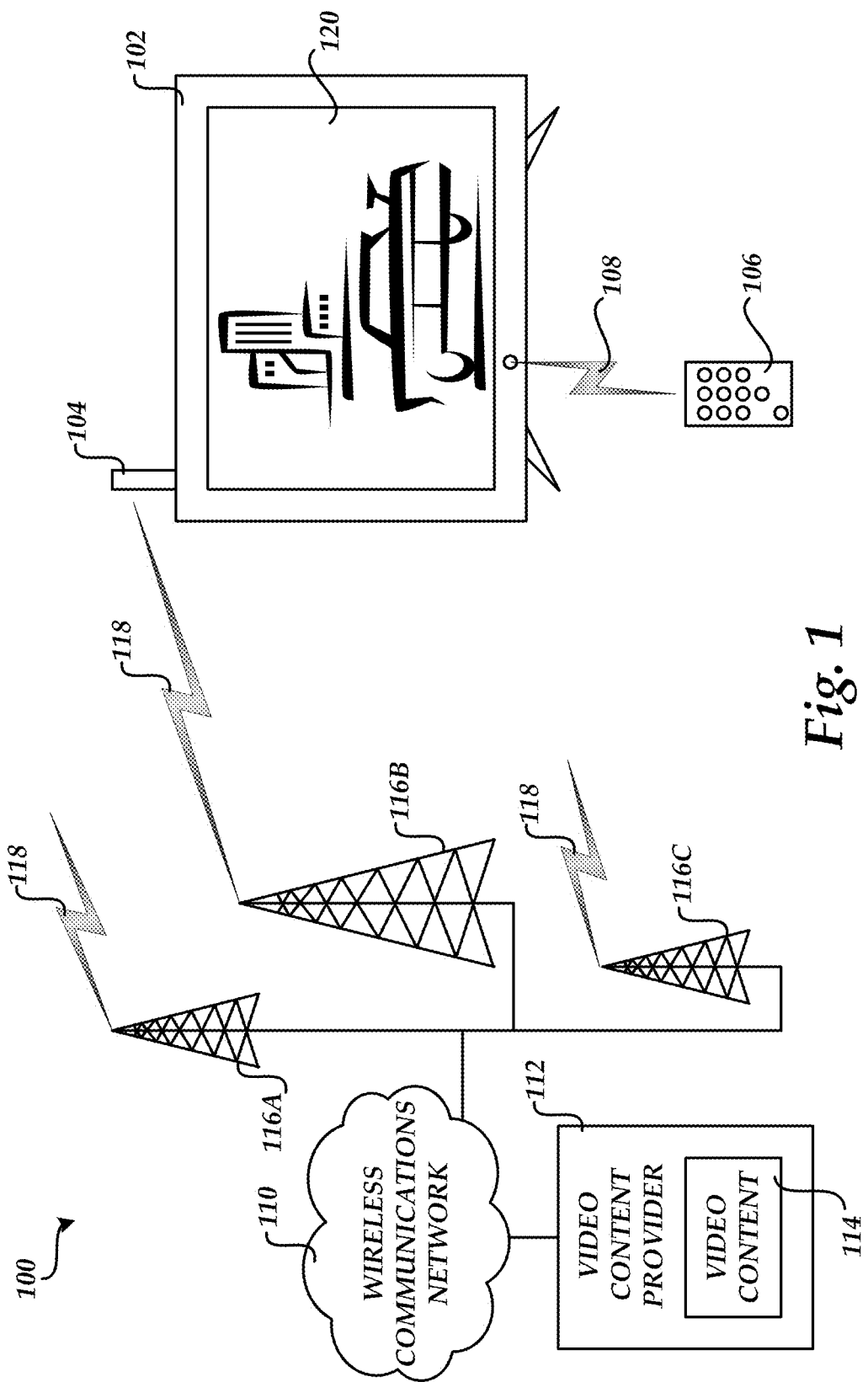
FIG. 1 is a block diagram showing aspects of an illustrative operating environment for the disclosure presented herein and aspects of an apparatus provided herein for receiving and displaying cellular television.

The following detailed description is directed to an apparatus for receiving and displaying cellular television and method for billing for same. In the following detailed description, references are made to the accompanying drawings that form a part hereof, and which are shown by way of illustration specific embodiments or examples. Referring now to the drawings, in which like numerals represent like elements through the several figures, aspects of the apparatus and methods provided herein will be described.

FIG. 1 shows an illustrative operating environment for the disclosure provided herein along with aspects of a display device 102 also provided herein. As shown in FIG. 1, the display device 102 operates in conjunction with a wireless telecommunications network 110. Although the term "cellular television" is utilized herein to describe the delivery of digital video content via a wireless telecommunications network, it should be appreciated that the network 110 may comprise a cellular or other type of wireless network. In particular, the wireless network 110 may comprise any type of wireless network capable of delivering data to a wireless device, such as a wireless mobile telephone, at speeds sufficient to enable the delivery of compressed digital video content. Examples of such systems include General Packet Radio Service ("GPRS") networks, Global System for Mobile Communications ("GSM") networks, Personal Communications Service ("PCS") networks, 1x Evolution-Data Optimized ("EVDO") networks, and Enhanced Data Rates for GSM Evolution ("EDGE") networks. Other suitable networks will be or become apparent to those skilled in the art. It should be appreciated that although the embodiments presented herein are described in the context of a wireless telecommunications network, other types of wireless networks may be utilized. For instance, WI-FI networks, WI-MAX networks, and other types of data-only networks may be utilized with the embodiments presented herein.

As shown in FIG. 1, in one embodiment the wireless telecommunications network 110 utilizes a series of towers 116A-116C, and/or repeaters, to deliver a wireless signal 118 to subscribers. The wireless signal 118 may be encoded and multiplexed for simultaneous delivery of data and voice to many hundreds or thousands of subscribers within a particular geographic area. In particular, the wireless telecommunications network 110 may be utilized to place and receive wireless telephone calls utilizing a suitable wireless mobile telephone, to transmit and receive short messaging service ("SMS") messages, and to transmit data of other types.

One type of data, in particular, that may be transmitted over the wireless telecommunications network 110 is digital video content 114. The digital video content 114 is provided by a video content provider 112 also connected to the wireless communications network 110. The video content provider 112 may be the operator of the wireless telecommunications network 110 or another third-party provider.

Utilizing a suitably equipped wireless mobile telephone, or other wireless communication device, a subscriber may access and view the digital video content 114. It should be appreciated that many different streams of digital video content, or "channels," may be provided by the video content provider 112. Accordingly, the experience of viewing the digital video content 114 on a wireless mobile telephone is akin to watching traditional television. As a result, the wireless delivery of digital video content is widely referred to as "cellular television," even though the delivery network may not be a cellular network and even though the delivered content is not traditional television. Nonetheless, the term "cellular television" is utilized herein to refer to the delivery of digital video content via a wireless telecommunications network, such as the network shown in FIG. 1. It should be appreciated that although the embodiments described herein have been presented in the context of a wireless mobile telephone, any other type of wireless communication device capable of receiving a wireless data signal may be utilized. For instance, wireless-capable personal digital assistants ("PDAs") and digital audio players may be utilized.

According to various embodiments provided herein, a display device 102 is provided for receiving and displaying the video content 114 over the wireless telecommunications network 110. As will be described in greater detail below, the display device 102 is configured with an antenna 104 and a wireless communication device, e.g., wireless radio, suitable for connecting to the wireless telecommunications network 110 and for receiving the video content 114. The display device 102 also includes the necessary processing components to decompress the video content 114 and to provide a display 120 of the content on a video display. According to embodiments, the video display is sized in the range of traditional television sets or display monitors. For instance, the video display may be 13 inches or larger in various embodiments.

According to other embodiments, the display device 102 may also include a television receiver for receiving traditional OTA or cable television broadcasts. The display device 102 may also include an external input for receiving an external video signal. A mechanism may also be provided through which a user can select between the cellular television display, the television signal, or the external video signal. In this manner, the display device 102 provides the ability to view not only cellular television, but also traditional television and video sources as well.

According to other embodiments, a remote control device 106 is provided for use with the display device 102. In particular, the remote control device 106 is operative to communicate with the display device 102 over a suitable wireless data connection 108. For instance, a BLUETOOTH or WI-FI connection may be established between the remote control device 106 and the display device 102. Through the connection 108, the remote control device 106 may be utilized to control various aspects of the operation of the display device 102.

In one embodiment, the display device 102 is equipped with a speaker and a microphone. Utilizing the remote control device 106, a user can initiate a wireless telephone call over the wireless communications network 110. The speaker and microphone may be utilized to play and receive the audio portion of the wireless telephone call, respectively. In an alternate embodiment, the speaker and microphone may be positioned in the remote control device 106. In this embodiment, the audio portion of the wireless telephone call may be transmitted between the display device 102 and the remote control device 106 using the connection 108. Additional details regarding the operation of the display device 102 and the remote control device 106 are provided below with respect to FIGS. 2-5.

Figure 2:
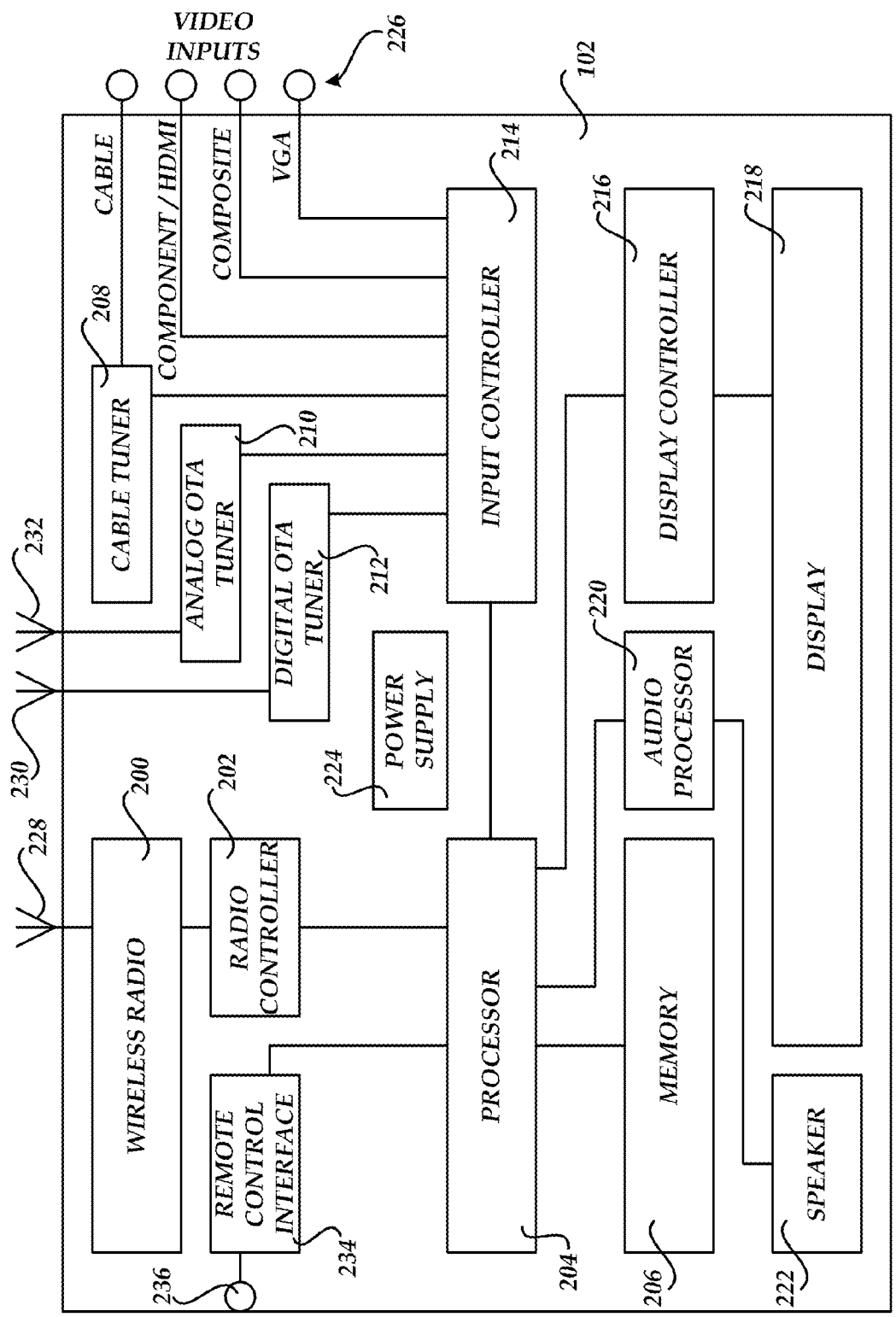
FIG. 2 is a functional circuit diagram showing an illustrative hardware architecture for an apparatus provided herein for receiving and displaying cellular television.

Referring now to FIG. 2, details regarding an illustrative hardware architecture for implementing the display device 102 will be provided. It should be appreciated that the illustrative hardware architecture shown in FIG. 2 is merely illustrative and that other architectures may be utilized. The architecture shown in FIG. 2 includes a processor 204 for controlling the operation of the display device 102. The processor 204 may comprise a general purpose central processing unit ("CPU"), a more specific purpose programmable logic controller ("PLC"), a programmable gate array, or other type of processor suitable for controlling the operation of a display device known to those skilled in the art.

The processor 204 is connected to a memory 206. The memory 206 may comprise a volatile or non-volatile memory that includes program code executed by the processor 204 for controlling the operation of the display device 102. The memory 206 may also be utilized by the processor 204 for temporary data storage when decoding the video content 114 or performing other computational tasks.

In one embodiment, the processor 204 is also connected to a radio controller 202 and a wireless communications device, such as the wireless radio 200. The wireless radio 200 and the radio controller 202 enable the display device 102 to connect to a suitable wireless telecommunications network using the antenna 228. The wireless radio 200 and the radio controller 202, when utilized in conjunction with the processor 204, also allow the display device 102 to retrieve the digital video content 114 over the wireless telecommunications network 110. As will be discussed in greater detail below, the processor 204 is operative to cause the video content 114 to be displayed on a video display 218. It should be appreciated that although the embodiments presented herein are described as utilizing a wireless radio 200, any type of wireless communications device capable of receiving a wireless data signal may be utilized.

According to embodiments, the display device 102 also includes one or more television receivers. For instance, in the implementation illustrated in FIG. 2, the display device 102 includes an analog OTA tuner 210 for receiving analog broadcast television and a digital OTA tuner 212 for receiving digital high definition broadcast television. Each of the tuners 210 and 212 may include a respective antenna 232 and 230, or an external input for connecting an appropriate antenna. According to embodiments, the display device 102 also includes a cable tuner 208 and corresponding external input for receiving a coaxial cable television signal. Other video inputs 226 may also be provided for receiving external video signals such as component, HDMI, composite, VGA, or other types of video signals. It should be appreciated that although the embodiments are described as having the tuners 210 and 212, any type of television receiver may be utilized.

According to other aspects, the display device 102 includes an input controller 214 connected to the processor 204. Through the use of the input controller 214, the processor 204 can control which video signal is displayed on the display 218. In particular, the processor can control whether the cellular television content received over the wireless telecommunications network 110, the television signals received from the tuners 208, 210, and 212, or the external video signals received at the video inputs 226 are displayed. User input may be provided via a control panel (not shown in FIG. 1) or the remote control device 106 to select the desired signal for display.

In order to display the video signal, the processor 204 is connected to a display controller 216. The display controller 216 provides functionality for formatting the video signals and generating the appropriate output signal for driving the video display 218. As discussed briefly above, the video display 218 is sized in the range of a traditional television set or display monitor. The video display 218 may comprise a suitable liquid crystal display ("LCD"), plasma panel, or conventional cathode ray tube ("CRT") display screen.

The processor 204 may also be connected to an audio processor 220 for playing the audio portion of received video signals and the audio portion of wireless telephone calls. The audio processor 220 is, in turn, connected to a speaker 222 for generating the actual audio signals. The audio processor 220 may include an amplifier for driving the speaker 222. A power supply 224 is also provided for generating and providing an appropriate power supply to the various hardware components described herein.

According to implementations, the display device 102 also includes a remote control interface 234 and remote control receiver 236. The remote control interface 234 comprises a suitable wireless data interface for sending data to and receiving data from the remote control device 106. Because audio may be received from and transmitted to the remote control device 106, the remote control interface 234 must support a sufficiently high bandwidth connection to the remote control device 106. For instance, in implementations, the remote control interface 234 comprises a transceiver compatible with the BLUETOOTH or WI-FI communications standards. Other appropriate wireless data communications standards will be or become apparent to those skilled in the art. Additional details regarding the operation of the display device 102 in conjunction with the remote control device 106 will be provided below with respect to FIG. 3.

Figure 3:
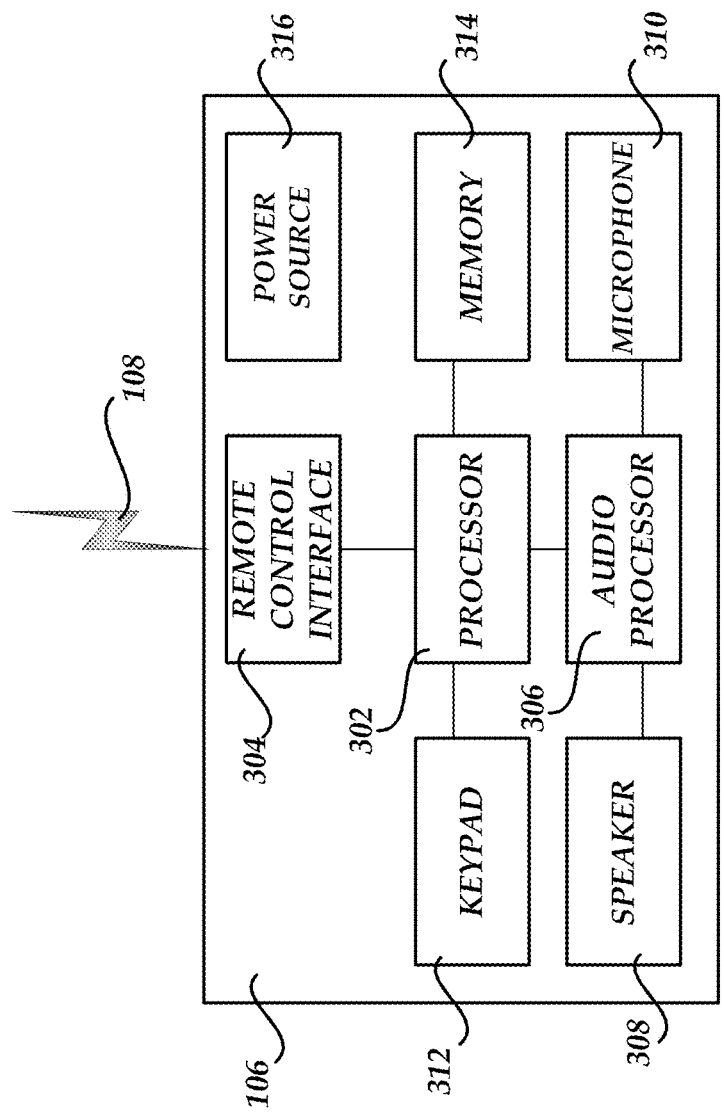
FIG. 3 is a functional circuit diagram showing an illustrative hardware architecture for a remote control device provided herein for use with the apparatus shown in FIGS. 1-2 and 4-5.

Turning now to FIG. 3, additional details regarding a hardware architecture for a remote control device 106 will be provided. As shown in FIG. 3, and described briefly above, the remote control device 106 is operative to communicate with the display device 102 over a wireless connection 108. In order to enable this communication, the remote control device 106 includes a remote control interface 304 compatible with the remote control interface 234 in the display device 102. The remote control interface 234 and the other functions of the remote control device 106 are controlled by a suitable low-power processor 302.

The processor 302 is connected to a memory 314 that may store a firmware program for controlling the operation of the remote control device 106. The processor 302 is also connected to a numeric or alphanumeric keypad 312 and an audio processor 306. The audio processor 306 may be, in turn, connected to a speaker 308 and a microphone 310. In operation, signals received from the keypad 312 and the microphone 310 may be transmitted to the display device 102 via the connection 108. Similarly, an audio signal may be received from the display device 102 and played back on the speaker 308, by way of the processor 302 and the audio processor 306.

In use, the remote control device 106 may be utilized to control the conventional functions of the display device 102. For instance, the remote control device 106 may be utilized to control power, channel, input, picture settings, volume, and other typical settings of the display device 102. In embodiments, the remote control device 106 may also be utilized to initiate a wireless telephone call from the display device 102. The call may be initiated as a new outgoing telephone call or in response to an incoming call request. Details regarding the call, such as caller identification information, call status, duration, and other information may be displayed on the display screen 218 by the processor 204.

In embodiments, the microphone 310 and the speaker 308 may be utilized to provide the audio portion of the wireless telephone call. During a wireless telephone call, the cellular television content may be paused, audio muted, or otherwise discontinued. When the wireless telephone call has completed, display of the cellular television content may be resumed. The remote control device 106 also includes an appropriate power source 316, such as a rechargeable battery pack.

Figure 4:
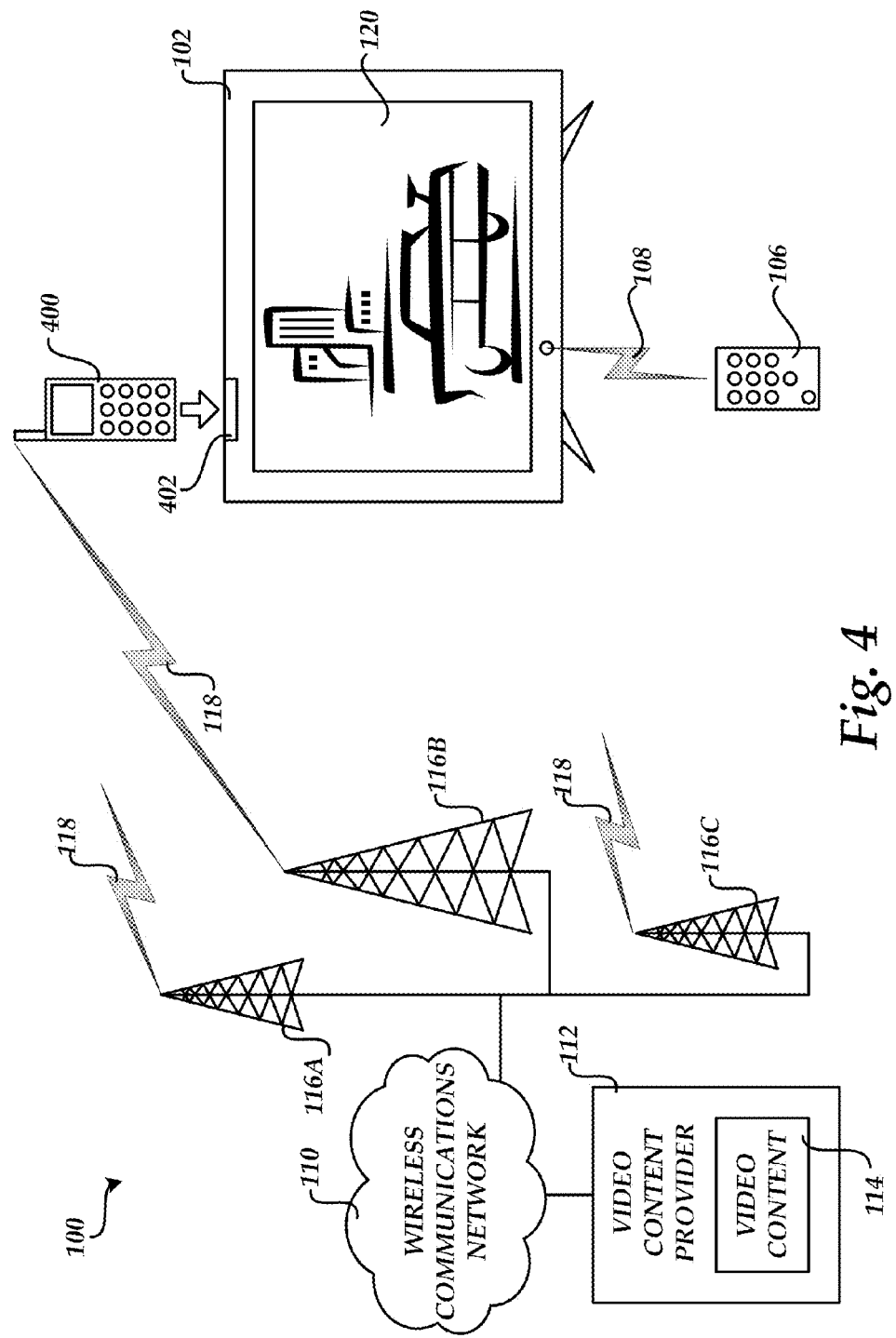
FIG. 4 is a block diagram showing additional details regarding an apparatus provided herein for receiving and displaying cellular television.

Referring now to FIG. 4, additional details regarding an alternate implementation of the display device 102 will be provided. In this implementation, the display device 102 does not include an integrated wireless communications device for connecting to the wireless telecommunication network 110. Instead, a suitable interface 402 is provided for receiving a wireless communication device capable of connecting to a wireless data network, such as the wireless mobile telephone 400. In the implementation shown in FIG. 4, the wireless mobile telephone 400 is capable of connecting to the wireless telecommunications network 110 and receiving the cellular television content. In turn, the display device 102 includes hardware components for receiving the cellular television content from the wireless mobile telephone 400 and for providing a display 120 of the content on a display screen. Through the interface 402, power may also be provided to the wireless mobile telephone 400 for charging its battery. Additional details regarding the hardware and operation of the display device 102 in this embodiment are provided below with respect to FIG. 5. It should be appreciated that although the wireless mobile telephone is illustrated in FIG. 4, any type of wireless communication device capable of connecting to and receiving data over a wireless telecommunications network may be utilized.

Figure 5:
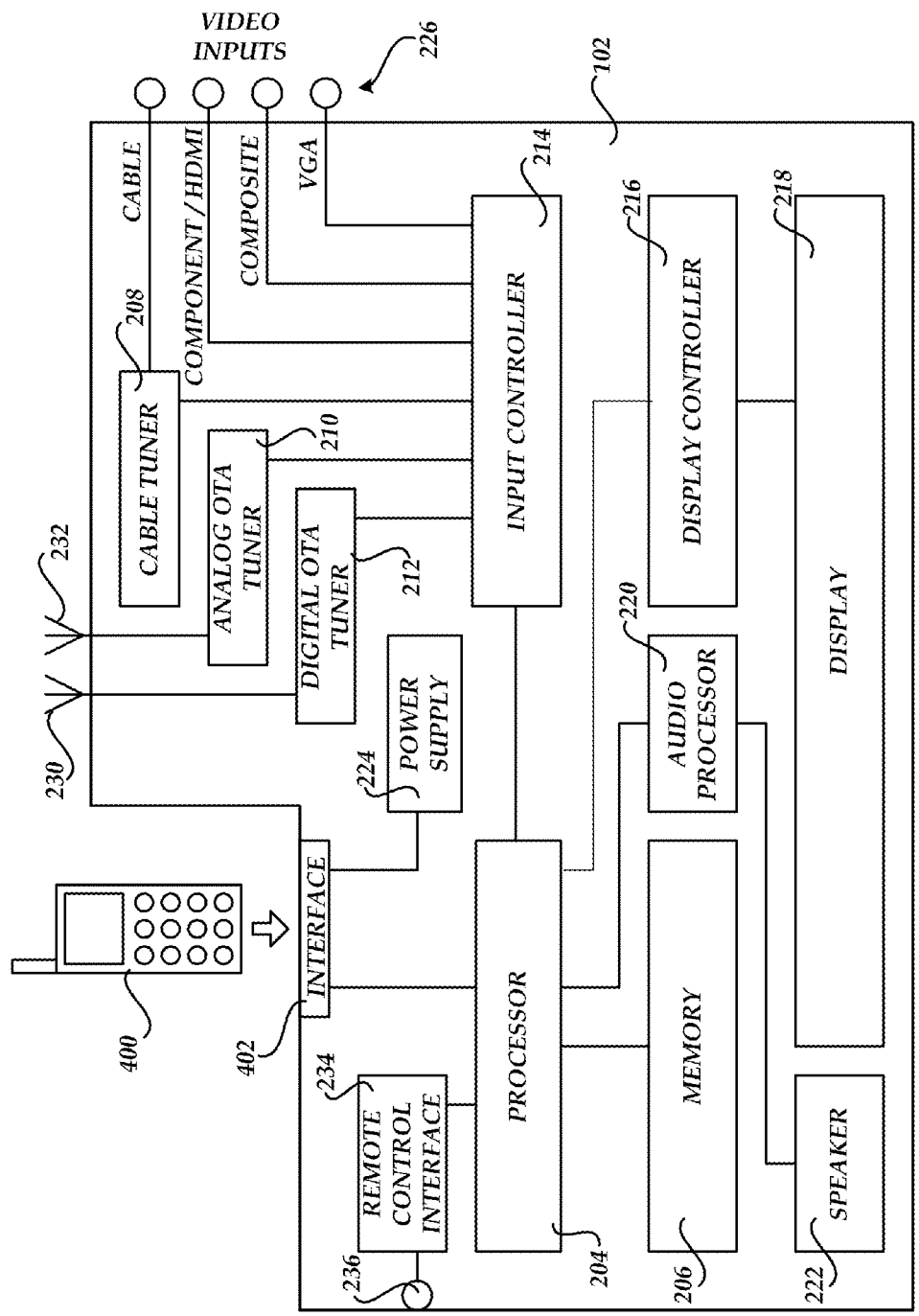
FIG. 5 is a functional circuit diagram showing an alternative hardware architecture for an apparatus provided herein for receiving and displaying cellular television.

Turning now to FIG. 5, details regarding an alternate hardware architecture for the display device 102 will be provided. As discussed briefly above, the display device 102 in this embodiment includes most of the components discussed above with respect to FIG. 2. The display device 102 in this embodiment does not, however, include the wireless radio 200, the radio controller 202, or the antenna 228. Instead, the display device 102 includes an interface 402 configured to receive and dock with a wireless communication device, such as the wireless mobile telephone 400.

Through the interface 402 and related circuitry, the processor 204 can receive data and voice communications signals from the docked wireless communication device. In particular, the processor 204 can control the operation of the telephone 400, such as for instance, to place or receive a wireless telephone call or to connect to and retrieve the video content 114. The processor 204 can also receive data from the telephone 400, including the video content 114, text messages, and other data. This data can then be formatted for the processor 204 for display on the display screen 218. In this manner, the functionality described above may be provided without including a wireless radio in the display device.

According to embodiments, the interface 402 is configured for use with adapters that allow the use of wireless communication devices from different manufacturers and vendors. Additionally, according to one embodiment, the interface 402 may be connected to the power supply 224 to provide power to a docked device. For instance, in the implementation shown in FIG. 5, the power may be utilized to power the operation of the telephone 400 and to recharge its battery supply.

Due to the unique nature of the display device 102, an operator of the wireless telecommunications network 110 and the video content provider 112 may be inclined to provide a customized rate plan to a user of the device 102. The rate plan defines the charges that are made by the provider to the user for provision of the cellular television services. For instance, as described in greater detail below with reference to FIG. 6, an operator may provide a discount to a user of the device 102 if the user also subscribes for cellular television service on a wireless mobile telephone. Similarly, a discount may be provided to a subscriber that subscribes for service on multiple display devices. Discounts may also be provided for off-peak hour usage and for low bandwidth usage. These discounts may be combined in virtually any manner. Additional details regarding this method for billing a user of the display device 102 are provided below with respect to FIG. 6.

It should be appreciated that, according to one implementation, the device 102 may be equipped with the necessary components for creating a digital recording of the received digital video content. This functionality is referred to as a digital video recorder ("DVR"). According to other aspects, the wireless communication device may also be equipped with DVR functionality. In implementations, the wireless communication device is operative to transfer previously recorded digital video content to the device 102 when docked. In this manner, content may be recorded on the wireless communication device for later playback on the device 102 when docked.

Figure 6:
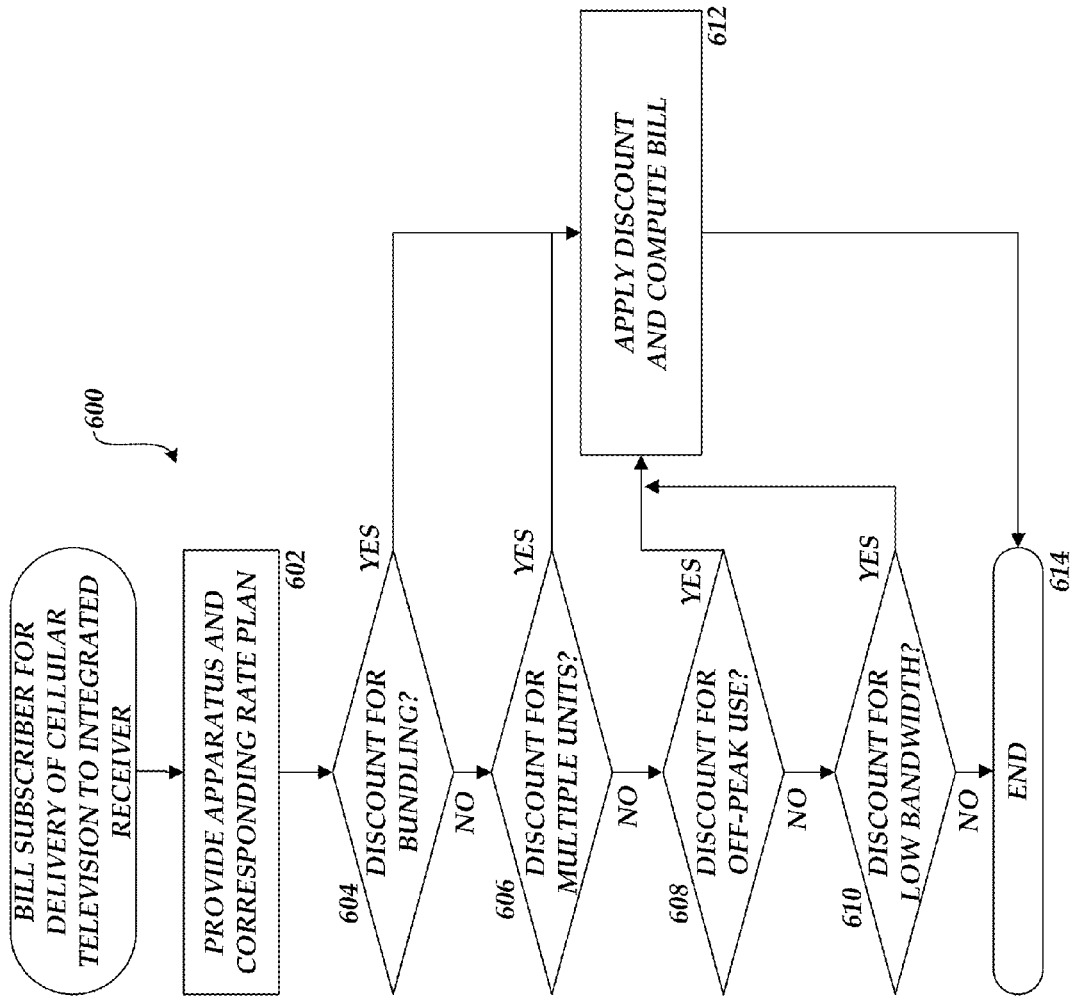
FIG. 6 is a flow diagram illustrating aspects of a method provided herein for billing a wireless subscriber utilizing the apparatus described below.

Referring now to FIG. 6, an illustrative routine 600 will be described for billing a user of the display device 102 described herein. It should be appreciated that the logical operations described herein may be implemented (1) as a sequence of computer implemented acts or program modules running on a computing system and/or (2) as interconnected machine logic circuits or circuit modules within the computing system. The implementation is a matter of choice dependent on the performance requirements of the computing system. Accordingly, the logical operations described herein are referred to variously as operations, structural devices, acts, or modules. These operations, structural devices, acts and modules may be implemented in software, in firmware, in special purpose digital logic, and any combination.

The routine 600 begins at operation 602, where the display device 102 is provided to a user. At the time of purchase or installation of the device 102, the user may be required to subscribe to a rate plan for provision of cellular television service to the device. As described above, the rate plan may take into account such factors as the bundling of service for another display device 102 or mobile wireless telephone, the time of day that the service is utilized, and the data bandwidth required to provide the cellular television content. Accordingly, in order to determine the amount to bill the subscriber, the routine 600 continues to operation 604, where a determination is made as to whether a discount should be provided for bundling the cellular television service with another service, such as the provision of telephone service or cellular television service on another device. If so, the routine 600 branches from operation 604 to operation 612, where the discount is applied.

At operation 606, a determination is made as to whether a discount should be applied for the provision of cellular television service to multiple display devices. If so, the routine 600 branches to operation 612 where the discount is applied. Otherwise, the routine 600 continues to operation 608, where a determination is made as to whether a discount should be provide for off-peak usage of the cellular television services. If so, the routine 600 branches to operation 612 where the discount is applied. Otherwise, the routine 600 continues to operation 610, where a determination is made as to whether a discount should be applied based on the amount of bandwidth consumed by the user during the provision of the cellular television services. If so, the routine 600 branches to operation 612 where the discount is applied. At operation 612, the bill amount is also generated and the bill is transmitted to the user. From operation 612, the routine 600 continues to operation 614, where it ends. It should be appreciated that other types of billing methods may also be utilized with the embodiments presented herein, such as those presented in U.S. Pat. No. 7,054,642, entitled "Apparatus and Method for Providing Reduced Cost Cellular Service," which is assigned to the assignee of the instant patent application and incorporated by reference herein in its entirety.

Based on the foregoing, it should be appreciated that an apparatus and method are provided herein for receiving and displaying cellular television content. It should be appreciated that, according to embodiments, activation of wireless telephone service for a wireless mobile telephone may also cause the activation of cellular television content for the apparatus described herein. In other implementations, the apparatus described herein may be linked to other similar apparatuses utilizing master and slave technologies. In this manner, cellular television content may be received by one apparatus for display on another connected apparatus. Multiple apparatuses may also be activated for service at one time. The wireless service may also be activated through the use of the remote control device described herein.

Although the subject matter presented herein has been described in conjunction with one or more particular embodiments and implementations, it is to be understood that the invention defined in the appended claims is not necessarily limited to the specific structure, configuration, or functionality described herein. Rather, the specific structure, configuration, and functionality are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A non-transitory computer program product comprising instructions that, when executed by a wireless communications device comprising a processor, cause the wireless communications device to perform operations comprising:
    establishing a first connection to the cellular network;
    establishing a second connection to a display device that is external to the wireless communication device upon the wireless communication device being inserted into a dock interface of the display device;
    receiving digital video content via the first connection;
    sending the digital video content to the display device through the dock interface via the second connection for presentation on the display device;
    receiving a telephone call via the first connection;
    sending a first audio signal associated with the telephone call to the display device through the dock interface via the second connection for presentation via a speaker of the display device;
    sending caller identification information associated with the telephone call to the display device through the dock interface via the second connection for presentation on the display device;
    receiving a second audio signal associated with the telephone call from the display device, the second audio signal having been received by the display device from a control device via a third connection, the third connection communicatively coupling the control device to the display device; and
    sending the second audio signal to the cellular network via the first connection for use in the telephone call.

2. The non-transitory computer program product of claim 1, further comprising instructions that, when executed by the wireless communications device, cause the wireless communications device to perform the operations further comprising receiving power from the display device via the dock interface of the display device.

3. The non-transitory computer program product of claim 1, further comprising instructions that, when executed by the wireless communications device, cause the wireless communications device to perform the operations further comprising:
receiving audio content associated with the digital video content via the first connection; and
sending the audio content to the display device through the dock interface via the second connection for presentation via the speaker of the display device.

4. The non-transitory computer program product of claim 1, further comprising instructions that, when executed by the wireless communications device, cause the wireless communications device to perform the operations further comprising receiving a text message via the first connection.

5. The non-transitory computer program product of claim 4, further comprising instructions that, when executed by the wireless communications device, cause the wireless communications device to perform the operations further comprising sending the text message to the display device via the second connection for presentation on the display device.

6. The non-transitory computer program product of claim 1, further comprising instructions that, when executed by the wireless communications device, cause the wireless communications device to perform the operations further comprising sending call status information associated with the telephone call to the display device through the dock interface via the second connection for presentation on the display device.

7. The non-transitory computer program product of claim 1, further comprising instructions that, when executed by the wireless communications device, cause the wireless communications device to perform the operations further comprising sending call duration information associated with the telephone call to the display device through the dock interface via the second connection for presentation on the display device.

8. A display device comprising a dock interface, a remote control interface, a display screen, a speaker, a processor, and a memory comprising instructions that, when executed by the processor, cause the display device to perform operations comprising:
in response to docking a wireless communication device at the dock interface,
receiving, by the dock interface, digital audio content and digital video content from the wireless communication device, the digital audio content and the digital video content being provided to the wireless communication device via a cellular network,
receiving, by the dock interface, a first audio signal from the wireless communication device, the first audio signal being associated with a telephone call received by the wireless communication device and originating from the cellular network, and
receiving, by the dock interface, caller identification information from the wireless communication device, the caller identification information being associated with the telephone call;
receiving, by the remote control interface, a second audio signal from a remote control device, the second audio signal being for use in the telephone call;
providing, by the remote control interface, the second audio signal to the dock interface;
receiving, by the dock interface, the second audio signal from the remote control interface;
providing, by the dock interface, the second audio signal to the wireless communication device for sending the second audio signal to the cellular network for use in the telephone call;
displaying, by the display screen, the digital video content and the caller identification information; and
presenting, by the speaker, the digital audio content and the first audio signal.

9. The display device of claim 8, wherein the memory further comprises instructions that, when executed by the processor, cause the display device to perform the operations further comprising providing, by the dock interface, power to the wireless communication device.

10. The display device of claim 8, wherein the memory further comprises instructions that, when executed by the processor, cause the display device to perform the operations further comprising:
receiving, by the dock interface, a text message from the wireless communication device, wherein the text message is received by the wireless communication device via the cellular network; and
presenting, by the display screen, the text message.

11. The display device of claim 8, wherein the memory further comprises instructions that, when executed by the processor, cause the display device to perform the operations further comprising receiving, by the dock interface, call status information from the wireless communication device, the call status information being associated with the telephone call.

12. The display device of claim 8, wherein the memory further comprises instructions that, when executed by the processor, cause the display device to perform the operations further comprising receiving, by the dock interface, call duration information from the wireless communication device, the call duration information being associated with the telephone call.

13. A wireless communications device, comprising:
a processor; and
a memory in communication with the processor, the memory comprising instructions that, when executed by the processor, cause the processor to perform operations comprising
establishing a first connection to a cellular network,
establishing a second connection to a display device that is external to the wireless communication device upon the wireless communication device being inserted into a dock interface of the display device,
receiving the digital video content via the first connection,
sending the digital video content to the display device through the dock interface via the second connection for presentation on the display device,
receiving a telephone call via the first connection,
sending a first audio signal associated with the telephone call to the display device through the dock interface via the second connection for presentation via a speaker of the display device,
sending caller identification information associated with the telephone call to the display device through the dock interface via the second connection for presentation on the display device;
receiving a second audio signal associated with the telephone call from the display device, the second audio signal having been received by the display device from a control device via a third connection, the third connection communicatively coupling the control device to the display device, and sending the second audio signal to the cellular network via the first connection for use in the telephone call.

14. The wireless communications device of claim 13, wherein the instructions further comprise instructions that, when executed by the processor, cause the processor to perform the operations further comprising:

receiving a text message via the first connection; and sending the text message to the display device via the second connection such that the text message is presented on the display device.

15. The wireless communications device of claim 13, wherein the instructions further comprise instructions that, when executed by the processor, cause the processor to perform the operations further comprising sending call status information associated with the telephone call to the display device through the dock interface via the second connection for presentation on the display device.

16. The wireless communications device of claim 13, wherein the instructions further comprise instructions that, when executed by the processor, cause the processor to perform the operations further comprising sending call duration information associated with the telephone call to the display device through the dock interface via the second connection for presentation on the display device.

\* \* \* \* \*